(12) United States Patent
Fujiwara

(10) Patent No.: US 8,514,463 B2
(45) Date of Patent: Aug. 20, 2013

(54) IMAGE PROCESSING APPARATUS

(75) Inventor: Takashi Fujiwara, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 303 days.

(21) Appl. No.: 12/856,922

(22) Filed: Aug. 16, 2010

(65) Prior Publication Data

US 2011/0075226 A1    Mar. 31, 2011

(30) Foreign Application Priority Data

Sep. 30, 2009    (JP) ................................. 2009-227855

(51) Int. Cl.
*H04N 1/04* (2006.01)

(52) U.S. Cl.
USPC ........... 358/474; 358/496; 358/498; 399/110; 399/165; 271/162

(58) Field of Classification Search
USPC ................. 358/474, 496, 498, 501; 399/110, 399/165, 126, 405; 271/4.1, 162, 124
See application file for complete search history.

(56) References Cited

U.S. PATENT DOCUMENTS

| | | | |
|---|---|---|---|
| 7,784,893 B2* | 8/2010 | Ishida et al. | 347/16 |
| 7,815,296 B2* | 10/2010 | Kawamura | 347/86 |
| 7,826,109 B2* | 11/2010 | Ikeno et al. | 358/498 |
| 7,982,923 B2* | 7/2011 | Andoh et al. | 358/474 |
| 8,115,971 B2* | 2/2012 | Osakabe et al. | 358/474 |
| 8,120,821 B2* | 2/2012 | Ishida et al. | 358/474 |
| 8,223,405 B2* | 7/2012 | Osakabe et al. | 358/471 |
| 8,270,045 B2* | 9/2012 | Iwata | 358/497 |
| 8,300,279 B2* | 10/2012 | Mukai et al. | 358/474 |
| 2007/0243001 A1* | 10/2007 | Samoto | 400/320 |
| 2008/0030530 A1* | 2/2008 | Ishida et al. | 347/3 |
| 2009/0140107 A1 | 6/2009 | Murayama et al. | |

FOREIGN PATENT DOCUMENTS

| | | |
|---|---|---|
| CN | 1691737 A | 11/2005 |
| CN | 201044468 Y | 4/2008 |
| CN | 101300155 A | 11/2008 |
| CN | 101533240 A | 9/2009 |
| JP | 2001-197232 | 7/2001 |
| JP | 3430868 B2 | 7/2003 |
| JP | 2003-241443 | 8/2003 |
| JP | 2007-088681 | 4/2007 |

OTHER PUBLICATIONS

Office action received in Japanese Patent Application No. 2009-227855 mailed Jul. 19, 2011.
First Office Action in Chinese Counterpart Applicaton No. 201010294598.1, mailed Dec. 10, 2012.

* cited by examiner

*Primary Examiner* — Negussie Worku
(74) *Attorney, Agent, or Firm* — Banner & Witcoff, Ltd.

(57) ABSTRACT

An image processing apparatus is provided. The image processing apparatus includes a lower unit, an upper unit, a joint piece to connect the upper unit with the lower unit, a flat cable, and a holder piece, which is movable with respect to one of the upper unit and the lower unit when the upper unit is moved with respect to the lower unit. The holder piece includes a first opening, a second opening, and a path connecting the first opening and the second opening to hold the flat cable therein in a curved posture. When the upper unit is vertically moved, the holder member is vertically moved with respect to the one of the upper unit and the lower unit by shifting a range of curvature in the flat cable as the flat cable is pulled out of and withdrawn in the holder member.

10 Claims, 9 Drawing Sheets

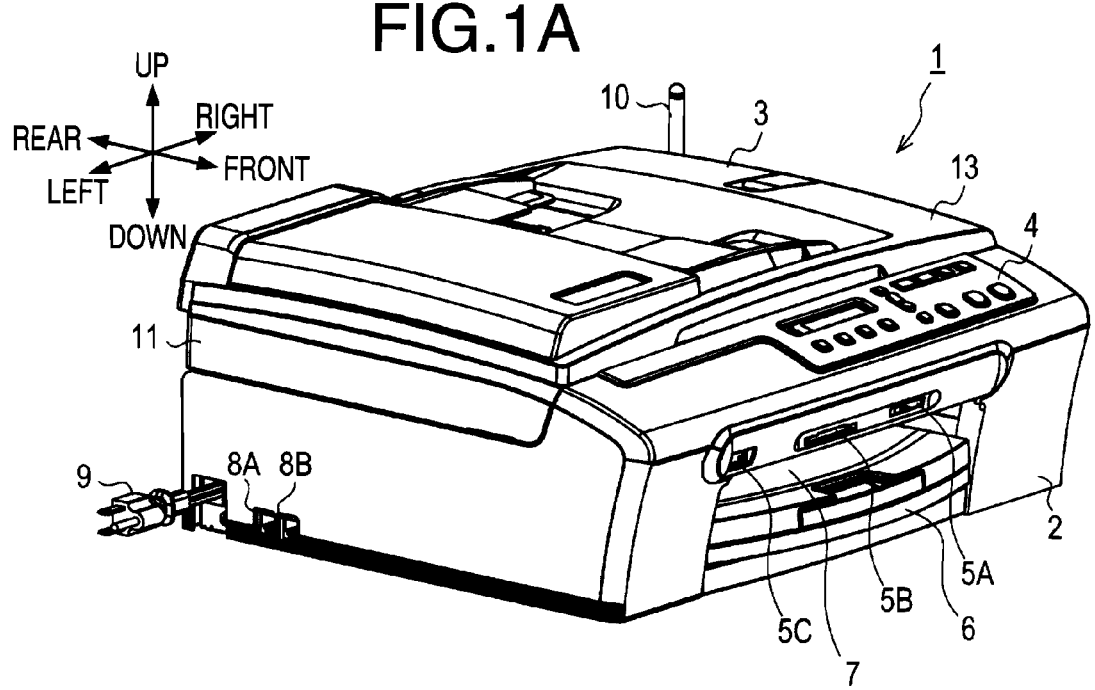
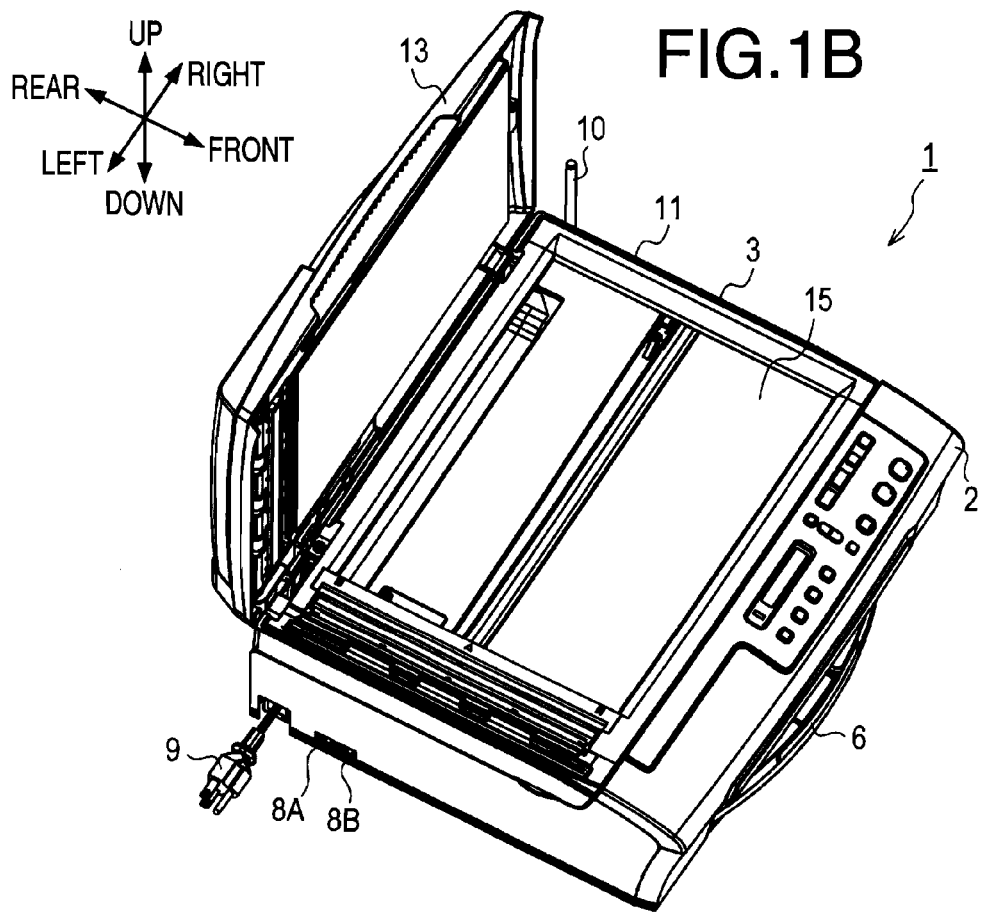

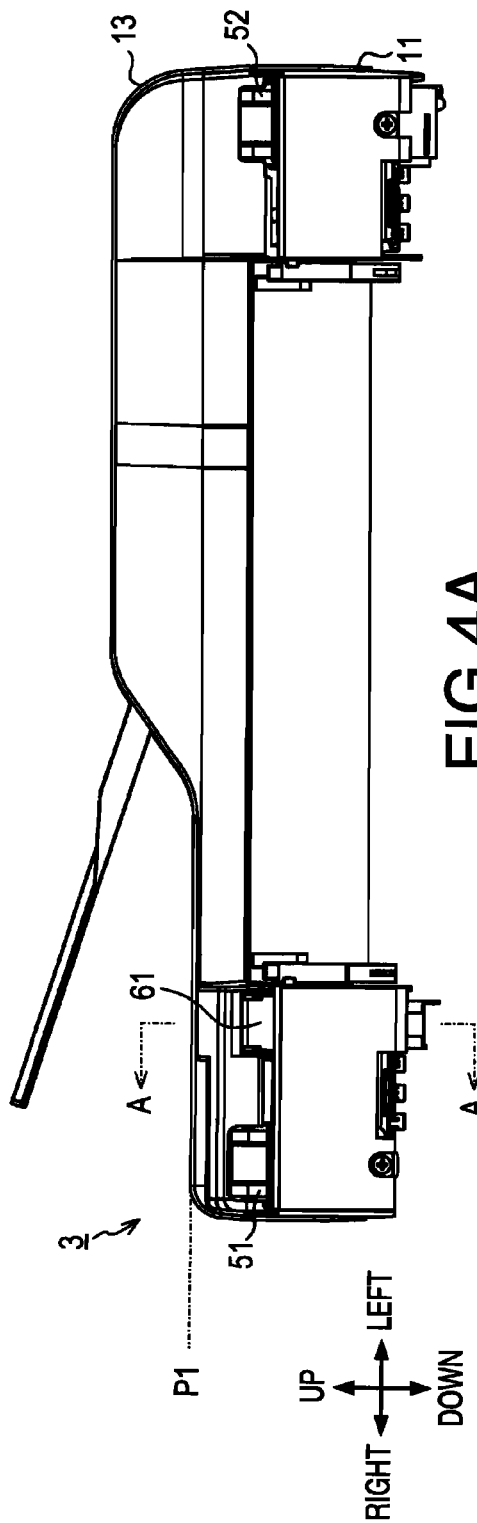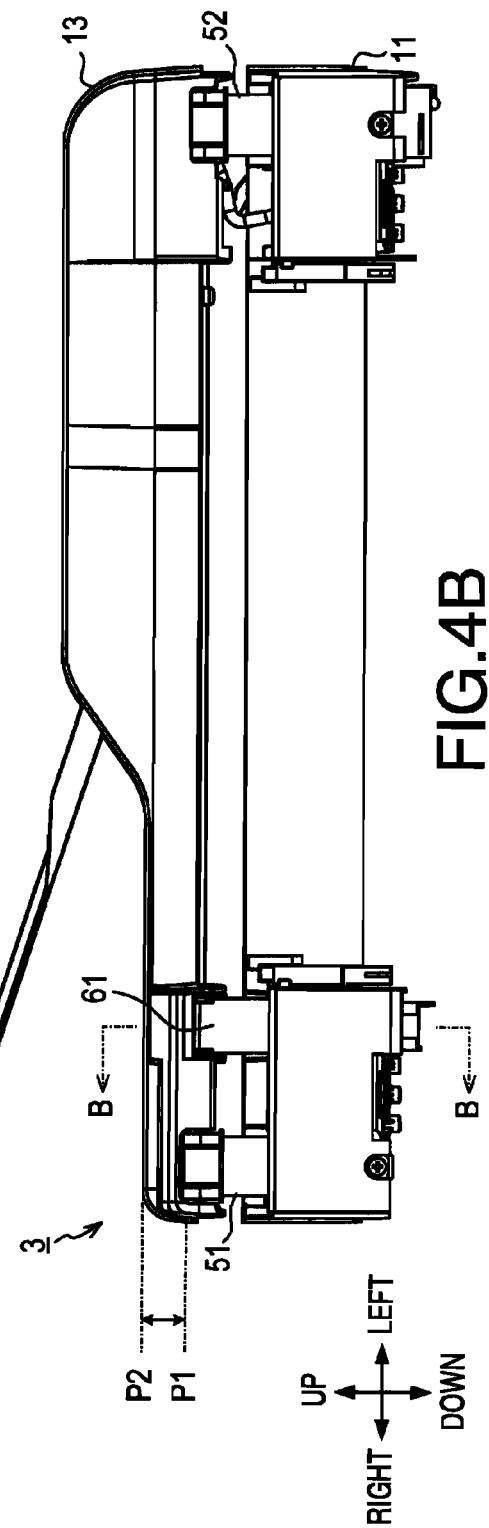

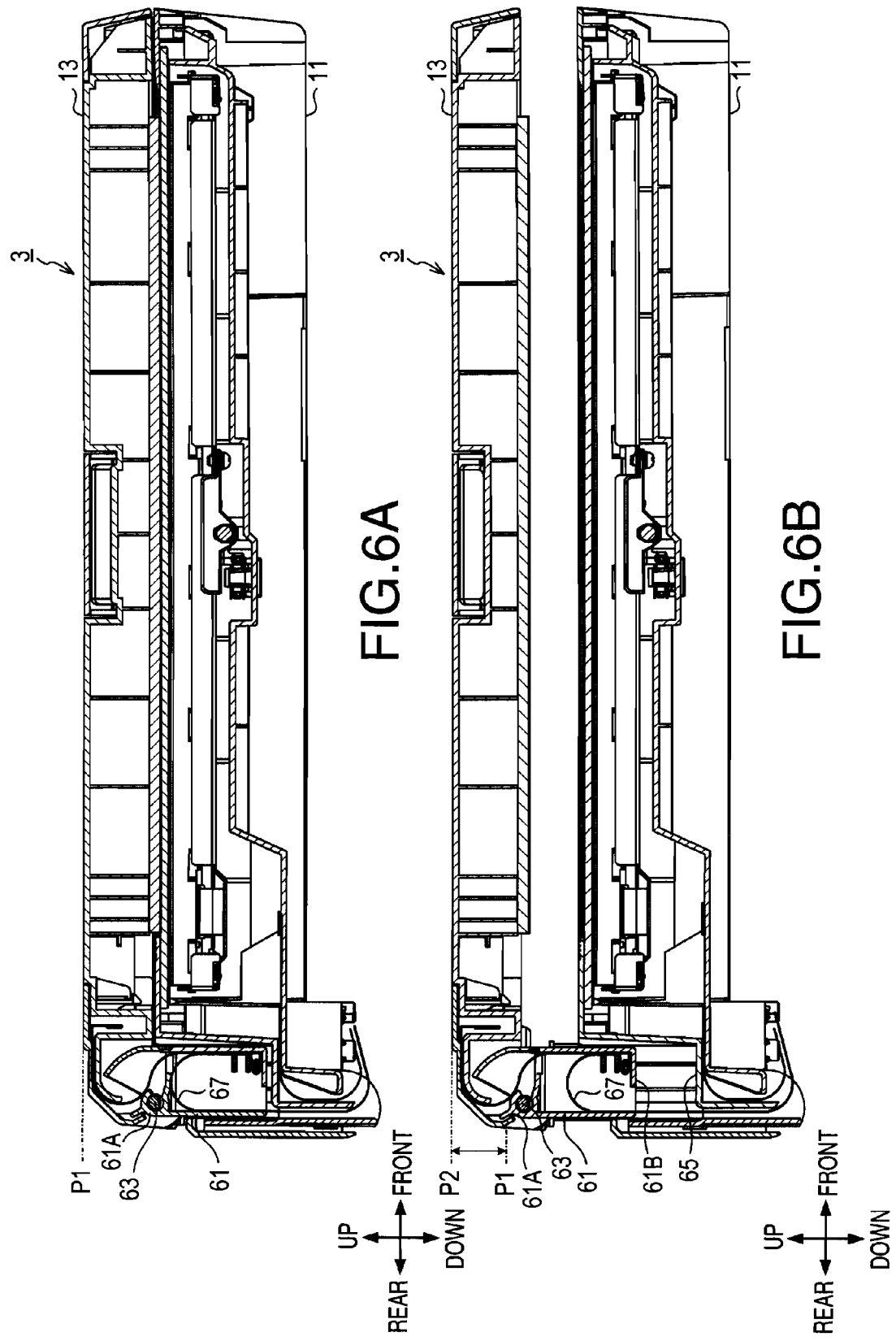

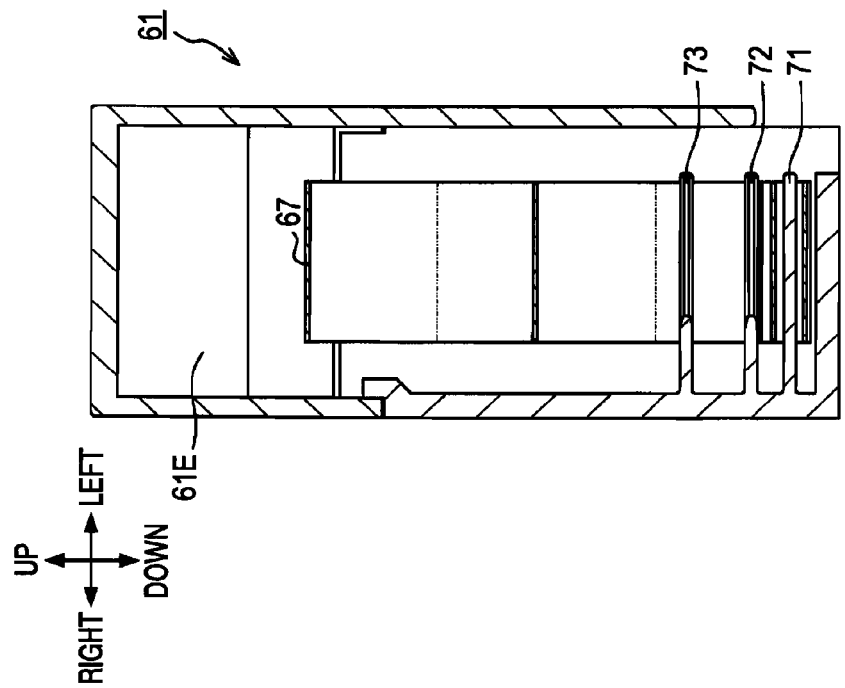
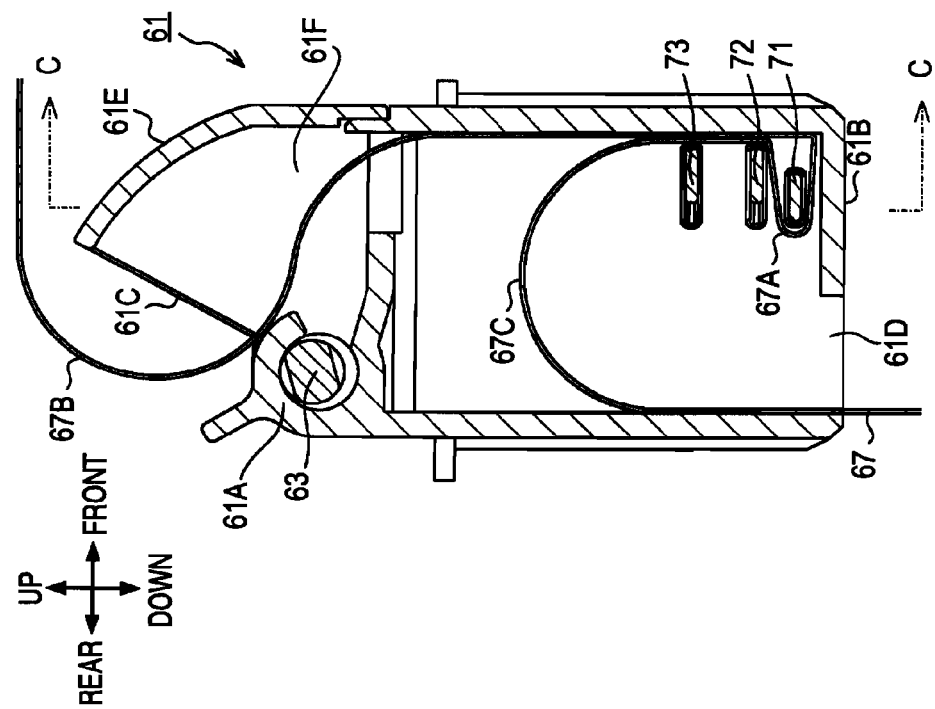
FIG.7B
FIG.7A

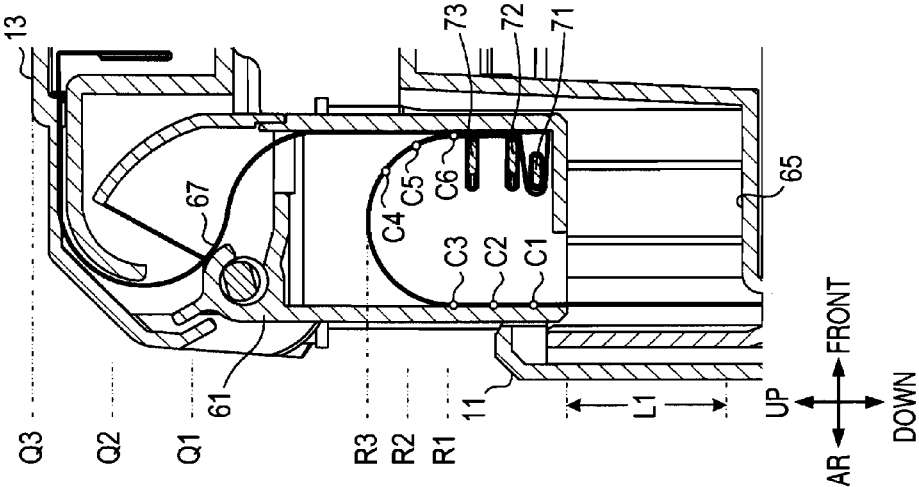
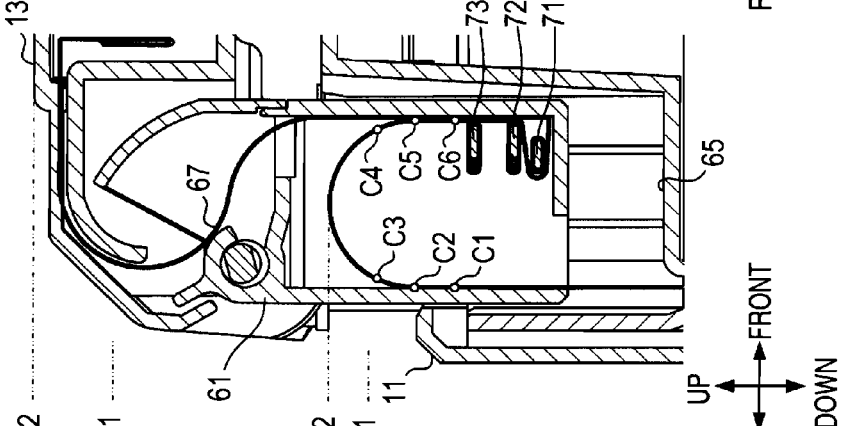
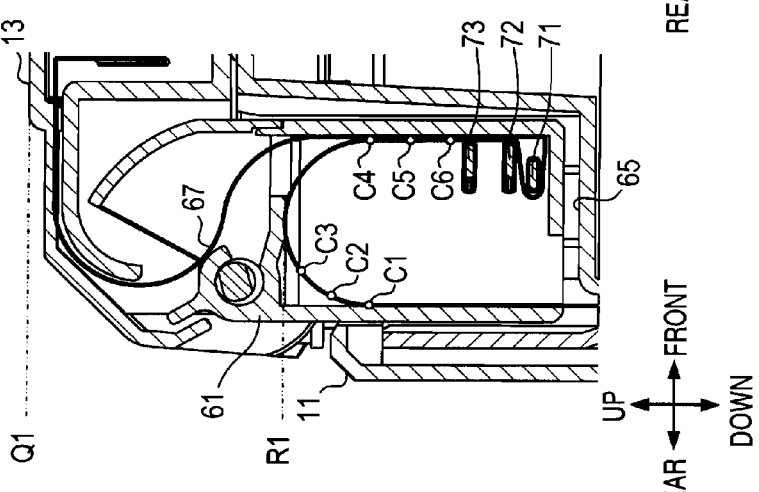

IMAGE PROCESSING APPARATUS

CROSS REFERENCE TO RELATED APPLICATION

This application claims priority from Japanese Patent Application No. 2009-227855, filed on Sep. 30, 2009, the entire subject matter of which is incorporated herein by reference.

BACKGROUND

1. Technical Field

An aspect of the present invention relates to an image processing apparatus having an upper part and a lower part, whilst the upper part is movable with respect to the lower part.

2. Related Art

An image processing apparatus having a main image reading unit and an automatic document feeder (ADF) on top of the main unit is known. In the image processing apparatus, the main unit and the ADF are connected by a cable, and the cable may be stored in a recessed section formed in the image processing apparatus.

In the image processing apparatus, the cable is housed in the recessed section and not exposed externally; therefore, the cable can be prevented from being caught and forcibly pulled by an obstacle. Further, the image processing apparatus with the storable cable exclude some restrictions of a location concerning arrangement of the image processing apparatus and may provide more options for the arrangement.

SUMMARY

In the above-mentioned image processing apparatus, for example, when the ADF is uplifted from an original position on the main unit in order to have a document with substantial thickness (e.g., a book) to be placed underneath the ADF to read an image formed on a page of the document, the cable is drawn out of the recessed section to be exposed.

In order to prevent the exposure of the cable, for example, a tube to have the cable inside to protect the cable may be provided to the ADF so that the tube having the cable therein is uplifted when the ADF is uplifted. The tube may have a substantial length for the amount to be uplifted so that a lower end thereof remains unexposed in the recessed section.

Therefore, if the tube with substantial strength is arranged, the cable can be protected from external force even when the cable is dawn out of the recessed section along with the ADF.

Meanwhile, a lower portion of the cable, lower than the portion protected by the tube, is stored loosened in loops in the recessed section. Therefore, when the ADF is lowered back in the original position, and when the tube with certain strength is stored back in the recessed section, the tube may press the loosened lower portion of the cable downward forcibly, and the cable may be damaged. Although the tube may be formed with a softer and more flexible material, such a tube may not be hard enough to protect the cable.

Alternatively to the tube, for example, the cable may be arranged inside a hollow hinge member, which supports the ADF to be openable/closable. However, the hinge member is required to have substantial strength to hold the substantially-weighing ADF whilst the hinge member is formed to have the hollow. Accordingly, the hollowed hinge may be formed in a more complicated structure than a hinge which is not intended to have the cable inside.

Further, a flexible flat cable (FFC), which is often employed for the cable to connect the ADF with the main unit, tends to be damaged by external force, and the damaged FFC may be affected by static electricity and cause errors in signal transmission. Accordingly, it is important that the FFC is arranged in a protected structure and maintained unexposed. Meanwhile, the FFC is required to smoothly follow the movable unit such as the ADF without being interfered with by the protective structure.

In view of the above, the present invention is advantageous in that an image processing apparatus, having an upper part movable with respect to a lower part and a flat cable to electrically connect the upper part with the lower part, wherein the flat cable is protected from damages, is provided.

According to an aspect of the present invention, an image processing apparatus is provided. The image processing apparatus has at least one of an image reading unit to read an image formed on a recording medium and an image forming unit to form an image on a recording medium. The image processing apparatus includes a lower unit, an upper unit arranged on top of the lower unit, a joint member to connect the upper unit with the lower unit, whilst the connected upper unit is openable and vertically movable with respect to the lower unit, a flat cable to electrically connect the upper unit with the lower unit, and a holder member, which is movable with respect to one of the upper unit and the lower unit when the upper unit is moved with respect to the lower unit. The holder member includes a first opening, which is covered unexposed with the upper unit, a second opening, which is covered unexposed with the lower unit, and a path connecting the first opening and the second opening to hold the flat cable therein in a curved posture. When the upper unit is vertically moved with respect to the lower unit, the holder member is vertically moved with respect to the one of the upper unit and the lower unit by shifting a range of curvature in the flat cable as the flat cable is pulled out of and withdrawn in the holder member.

According to another aspect of the present invention, a holder member to hold a flat cable, which electrically connects an upper unit and a lower unit of an electric device, is provided. The upper unit is openable and vertically movable with respect to the lower unit. The holder member includes a first opening, which is covered unexposed with the upper unit, a second opening, which is covered unexposed with the lower unit, and a path connecting the first opening and the second opening to hold the flat cable therein in a curved posture. The holder member is movable with respect to one of the upper unit and the lower unit when the upper unit is moved with respect to the lower unit. When the upper unit is vertically moved with respect to the lower unit, the holder member is vertically moved with respect to the one of the upper unit and the lower unit by shifting a range of curvature in the flat cable as the flat cable is pulled out of and withdrawn in the holder member.

BRIEF DESCRIPTION OF THE ACCOMPANYING DRAWINGS

FIG. 1A is an overall perspective view of an MFP according to an embodiment of the present invention with a cover unit in a closed position. FIG. 1B is an overall perspective view of the MFP according to the embodiment of the present invention with the cover unit in an open position.

FIG. 4A illustrates a rear view of the scanner unit with the cover unit in a lowered position according to the embodiment of the present invention. FIG. 4B illustrates a rear view of the scanner unit with the cover unit in an uplifted position according to the embodiment of the present invention.

FIG. 6A is a cross-sectional side view of the scanner unit taken from a line A-A illustrated in FIG. 4A. FIG. 6B is a cross-sectional side view of the scanner unit taken from a line B-B illustrated in FIG. 4B.

FIG. 7A illustrates a cross-sectional view of a holder piece in the scanner unit according to the embodiment of the present invention. FIG. 7B illustrates a cross-sectional view of the holder piece taken from a line C-C illustrated in FIG. 7A.

FIGS. 8A-8C illustrate vertical movement of an FFC in the MFP according to the embodiment of the present invention.

DETAILED DESCRIPTION

Figure 2:
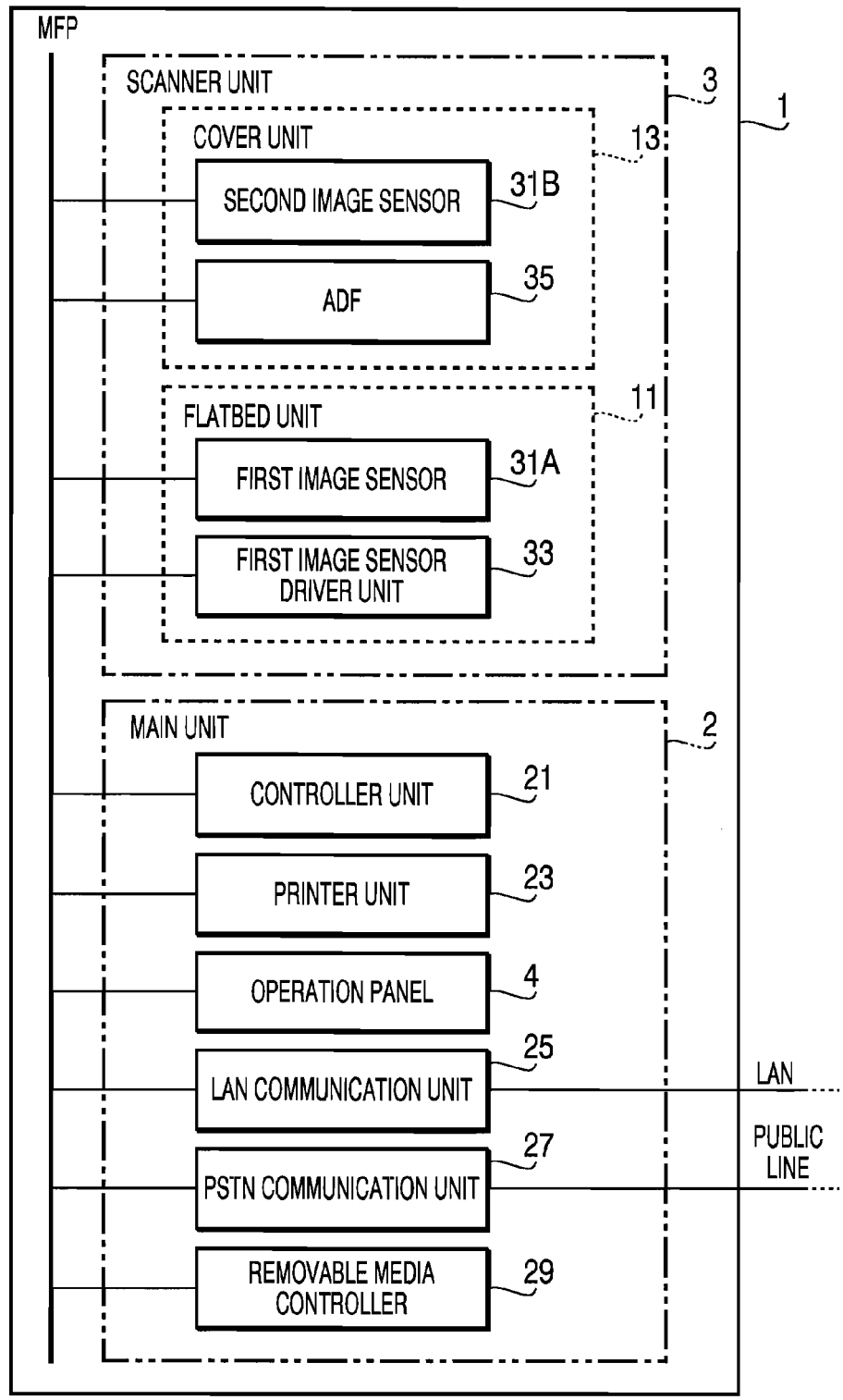
FIG. 2 is a block diagram to illustrate electrical configuration of the MFP according to the embodiment of the present invention.

Hereinafter, an embodiment of the present invention will be described with reference to the accompanying drawings. A multifunction peripheral device (MFP) 1 will represent an image processing device according to the present invention.

Overall Configuration of the MFP

The MFP 1 is equipped with a plurality of image processing functions, which include a scanning function, a printing function, a copier function, a facsimile transmission/receiving function, and a function for reading/writing data in a memory medium.

In the present embodiment, directions concerning the MFP 1 will be referred to in accordance with orientation of the MFP 1 shown in FIGS. 1A and 1B. That is, a viewer's nearer right-hand side appearing in FIGS. 1A, 1B is referred to as a front side of the MFP 1, and further left-hand side opposite from the front side is referred to as rear. Further, a side which corresponds to the viewer's nearer left-hand side is referred to as left, and an opposite side from the left, which corresponds to the viewer's further right-hand side is referred to as right. Furthermore, directions of the drawings in FIGS. 2-9 are similarly based on the orientation of the MFP 1 as defined above and correspond to those with respect to the MFP 1 shown in FIGS. 1A, 1B even when the drawings are viewed from different angles. However, upon installation of the MFP 1, arrangement of the MFP 1 may not necessarily rely on the orientation of the MFP 1 illustrated in the accompanying drawings.

The MFP 1 includes a main unit 2 at a bottom and a scanner unit 3 on top of the main unit 2. A lower rear edge of the scanner unit 2 is supported rotatably to rotate about a shaft (not shown), which extends in the right-left direction. Therefore, the scanner unit 3 can shift postures thereof between a closed position (see FIG. 1A) and an open position (not shown). When the scanner unit 3 is in the open position, a user can access an internal structure of the main unit 2 in order to, for example, repair and maintain operability of the main unit 2.

On top of the main unit 2 and in a nearer front part than the scanner unit 3, an operation panel 4 is arranged. The operation panel 4 is a user interface device including switches, which are operated by the user to input information concerning an operation in the MFP 1, and a liquid crystal display (LCD) to display information concerning the MFP 1.

The main unit 2 has memory card slots 5A, 5B and a USB connector 5C, through which removable memory media including memory cards and a USB memory are connected. The memory card slots 5A, 5B, and the USB connector 5C are arranged on a front side of the main unit 2. The removable memory media may store image data representing images to be processed in the MFP 1, and image data generated in the MFP 1 may be stored in the removable memory media through the memory card slots 5A, 5B, and the USB connector 5C.

The main unit 2 has a sheet-feed tray 6 on the front side thereof in a position below the memory card slots 5A, 5B, and the USB connector 5C. Recording sheets, on which images are to be formed in the MFP 1, are stored in the sheet-feed tray 6. Above the sheet-feed tray 6, a sheet-discharge slot 7, through which the recording sheets with the images formed thereon are discharged, is formed.

Further, on a left side of the main unit 2, telephone-line connectors 8A, 8B and a power cord 9 are provided. On a right side of the main unit 2, an antenna 10 for wireless communication is arranged.

The scanner unit 3 includes a flatbed unit 11, on which a source document with an original image to be read is set, and a cover unit 13, which covers a top of the flatbed unit 11. The top of the flatbed unit 11 is provided with a piece of flatbed glass 15, on which the document with the image is placed to have the image read by the scanner unit 3.

The cover unit 13 is rotatable about a rear edge thereof and can shift postures thereof between a closed position (see FIG. 1A) and an open position (see FIG. 1B) when a front part thereof is uplifted and lowered. Further, additionally to and separately from the rotating behavior, the cover unit 13 can shift positions in a lower position (see FIG. 4B) and an upper position (see FIG. 4B). Accordingly, a document with substantial thickness (e.g., a book) can be set steadily by the cover unit 13 between the flatbed unit 11 and the cover unit 13.

Controlling System of the MFP

A controlling system of the MFP 1 will be described hereinbelow with reference to FIG. 2. The main unit 2 of the MFP 1 includes a controller unit 21, a printer unit 23, a LAN communication unit 25, a PSTN communication unit 27, a removable media controller 29, and the operation panel 4. The scanner unit 3 of the MFP 1 includes a first image sensor 31A and a first image sensor driver 33 in the flatbed unit 11 and a second image sensor 31B and an automatic document feeder (ADF) 35 in the cover unit 13.

The controller unit 21 includes a known CPU, a ROM, and a RAM. The CPU manipulates the components of the MFP 1 according to controlling programs stored in the ROM and the RAM.

The printer unit 23 prints an image in an inkjet-printing method. When the copier function of the MFP 1 is used, the image read by the scanner unit 3 is printed by the printer unit 23 on the recording sheet. Meanwhile, when the facsimile receiving function is used, the image data received through the telephone line is printed on the recording sheet by the printer unit 23.

The LAN communication unit 25 includes a wireless communication interface (not shown) and a wired communication interface (not shown). The LAN communication unit 25 provides the interface to communicate with external devices for data exchange to the MFP 1.

The PSTN communication unit 27 includes devices to connect the MFP 1 to the public switched telephone networks (PSTN), which are, for example, a facsimile modem and audio codec. The PSTN communication unit 27 enables the MFP 1 to communicate with external device (e.g., a facsimile machine) through the PSTN. When image data is exchanges with an external device through the PSTN, the data is transmitted from or received in the PSTN communication unit 27.

The removable media controller unit 29 controls the data reading/writing operation in cooperation with the removable media attached to the memory card slots 5A, 5B, and the USB connector 5C in order to read data from and write data in the removable media.

The first image sensor 31A and the second image sensor 31B are, for example, contact image sensors (CIS) to optically read images from the document and converts the images into electric signals representing the images.

The first image sensor driver unit 33 includes a motor to drive the first image sensor 31A and a transmission (e.g., a timing belt) to transmit the driving force from the motor to the first image sensor 31A. The first image sensor driver unit 33 controlled by the controller unit 21 manipulates the first image sensor 31A to move in an auxiliary scanning direction, which is perpendicular to a main scanning direction.

The ADF 35 is a feeder unit to feed document sheets one by one in a feeding path to be read by the image sensors 31A, 31B.

Scanner Unit

Figure 3:
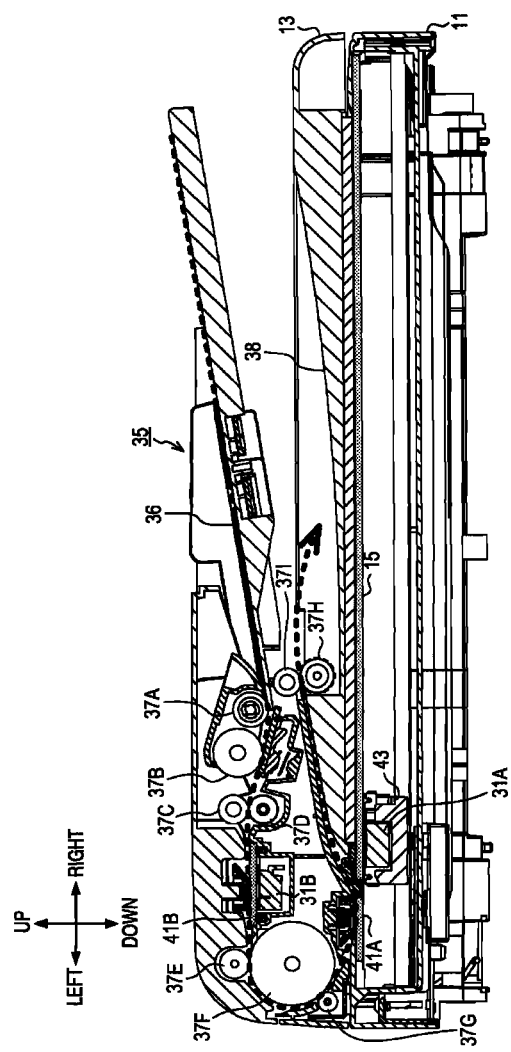
FIG. 3 illustrates a cross-sectional front view of a scanner unit in the MFP according to the embodiment of the present invention.

The scanner unit 3 will be described hereinbelow in detail. The ADF 35 in the scanner unit 3, as shown in FIG. 3, conveys the document sheets set in a document-feeder tray 36 one by one with a plurality of conveyer rollers 37A-37I. The document sheets are conveyed in a feeding path, which is indicated by a dotted line in FIG. 3, and are discharged in a document-discharge tray 38.

Along the feeding path, a piece of first ADF glass 41A and a piece of second ADF glass 41B are arranged. The document sheet being carried in the feeding path becomes in contact with the first ADF glass 41A and the second ADF glass 41B when the document sheet passes by the first ADF glass 41A and the second ADF glass 41B respectively.

The first ADF glass 41A is arranged on a same plane as the flatbed glass 15. More specifically, the first ADF glass 41A is arranged to have an upper surface and a lower surface thereof to be on same planes as an upper surface and a lower surface of the flatbed glass 15 respectively. Below the first ADF glass 41A and the flatbed glass 15, a carriage 43, which is reciprocated in a right-left direction by driving force from the motor, is provided. The first image sensor 31A is mounted on the carriage 43.

When the carriage 43 is driven in the right-left direction, therefore, the first image sensor 31A is moved in the same direction to positions under the first ADF glass 41A and the flatbed class 15.

The second ADF glass 41B is arranged along the feeding path on an upstream side with respect to the first ADF glass 41A. The second image sensor 31B is arranged to be fixed below the second ADF glass 41B.

When the scanner unit 3 is used in cooperation with the ADF 35 to read the images to serve as an ADF-typed image scanner, the first image sensor 31A is moved to stop at a predetermined position opposing the first ADF glass 41A.

As the sheet with the images is carried in the feeding path, one of the upper and lower surfaces of the sheet is scanned by the second image sensor 31B at the upstream side, and the other surface is scanned by the first image sensor 31A at the downstream side. Thus, the images formed on the both surfaces of the sheet can be read.

The first image sensor 31A and the second image sensor 31B are in the positions separated from each other; therefore, the second image sensor 31B is controlled to start reading the image on the one surface prior to the first image sensor 31A. The first image sensor 31A, meanwhile, is controlled to start reading the image on the other surface when the document sheet reaches a position opposing the first image sensor 31A.

According to the present embodiment, the user may select to activate the both first image sensor 31A and the second image sensor 31B or to activate solely one of the first and second image sensor 31A, 31B to read the both surfaces of the document sheet by input operations to the operation panel 4.

When the scanner unit 3 is used as a flatbed-typed image scanner to read the images, the first image sensor 31A is moved to stop at a predetermined starting position opposing the flatbed glass 15. The first image sensor 31A is carried from the starting position to the right along the flatbed glass 15 and sequentially scans the surface of the document sheet placed on top of the flatbed glass 15. Thus, the image formed on the document sheet is read by the first image sensor 31A.

Joint Pieces

Joint pieces 51, 52 to connect the flatbed unit 11 and the cover unit 13 will be described with reference to FIGS. 4A, 4B, and 5. The flatbed unit 11 and the cover unit 13 are connected with each other via the joint pieces 51, 52, which allow the cover unit 13 to be openable/closable and vertically shiftable with respect to the flatbed unit 11.

Figure 5:
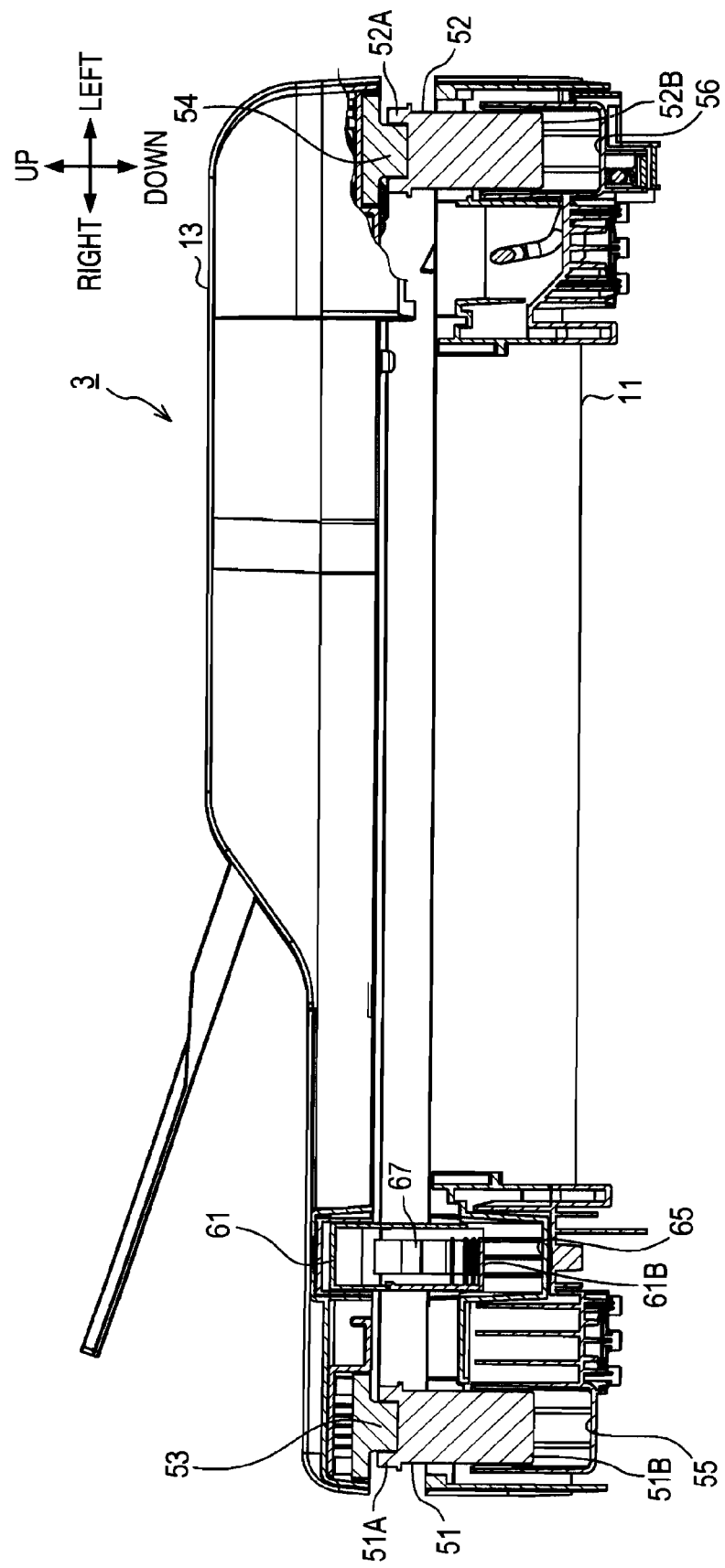
FIG. 5 illustrates a rear view of the scanner unit with joint assemblies being partially exposed according to the embodiment of the present invention.

As shown in FIG. 5, the joint pieces 51, 52 are formed to have bearing portions 51A, 52B respectively on top ends thereof. The cover unit 13 is, meanwhile, formed to have rotatable portions 53, 54, which are arranged in the bearing portions 51A, 52B rotatably about an axis (not shown). Thus, the cover unit 13 is rotatable and openable/closable with respect to the flatbed unit 11.

Lower ends of the joint pieces 51, 52 are inserted respectively in recessed portions 55, 56, which are formed in corresponding positions in the flatbed unit 11, to be vertically slidable. Therefore, the cover unit 13 connected with the joint pieces 51, 52 are vertically slidable with respect to the flatbed unit 11. According to the present embodiment, with the vertically movable cover unit 13, when the cover unit 13 is at a lowest level, a reference plane of the cover unit 13 is at a level P1 (see FIG. 4A). When the cover unit 13 is uplifted to a highest level, the reference plane of the cover unit 13 is at a level P2 (see FIG. 4B). When the reference plane of the cover unit 13 is at the highest level P2, the cover unit 13 is uplifted for approximately 20 millimeters (mm) with respect to the flatbed unit 11.

Holder Piece

A holder piece 61 will be described hereinbelow. The holder piece 61 is interposed between the flatbed unit 11 and the cover unit 13 and formed to have a bearing 61A at an upper portion thereof (see FIGS. 6A and 6B). The bearing 61A is rotatably coupled with a shaft 63, which is provided to the cover unit 13. The shaft 63 is arranged on a same line as the rotation axis of the rotatable portions 53, 54 of the cover unit 13 (see FIG. 5). Accordingly, the cover unit 13 rotates about the rotation axis of the rotatable portions 53, 54, and the cover unit 13 simultaneously rotates about the shaft 63 with respect to the holder piece 61.

A bottom end 61B of the holder piece 61 is inserted in a recessed portion 65, which is formed in the flatbed unit 11, from above. Accordingly, the holder piece 61 is vertically movable with respect to the flatbed unit 11. In other words, the holder piece 61 is rotatable about the rotation axis of the joint pieces 51, 52 and vertically movable along with the joint pieces 51, 52 and with the cover unit 13.

Inside the holder piece 61, a path 67F connecting from a first opening 61C to a second opening 61D is formed (see FIGS. 7A and 7B), and an FFC 67 is arranged in the path 61F.

The FFC 67 is a flexible flat cable which electrically connects components (e.g., the second image sensor 31B and the ADF 35) in the cover unit 13 and components (e.g., the control unit 21) in the main unit 2. Specifically, the FFC 67 is held in the holder piece 61 in a bended and curved posture (see FIG. 6A).

In particular, the holder piece 61 is internally formed have guiding projections, which are a first guide 71, a second guide 72, and a third guide 73. The FFC 67 is hooked to the first guide 71 at a fixed section 67A to be fixed to the holder piece 61. The second guide 72 and the third guide 73 hold the FFC 67 a Further, the FFC 67 is curved at a first curved section 67B, which is a section closer to the cover unit 13 with respect to the fixed section 67A. Furthermore, the FFC 67 is curved at a second curved section 67C, which is a section closer to the main unit 2 with respect to the fixed section 67A. The second guide 72 and the third guide 73 hold the FFC 67 along an inner wall of the holder piece 61 at sections in vicinities to the fixed section 67A.

When the cover unit 13 is moved to the open position, the FFC 67 is pulled upward by the cover unit 13. Accordingly, the curvature of the first curved section 67B may be deformed. The deformation of the curvature absorbs the tension, and the downstream side of the FFC 67, lower than the fixed section 67A, remains unaffected by the tension. Therefore, the cover unit 13 is allowed to be moved to the open position smoothly.

Meanwhile, when the cover unit 13 is uplifted along with the holder piece 61, the FFC is pulled upward. However, the second curved section 67C absorbs the tension, and the upstream side of the FFC 67, upper from the fixed section 67A, remains unaffected by the tension. Therefore, the holder unit 61 is allowed to be moved upward with respect to the main unit 2 to the uplifted position smoothly.

The behavior of the FFC 67 in the holder piece 61 will be described more specifically with reference to FIGS. 8A-8C. The holder piece 61 is movable between the lowest position and the highest position. A position Q1 (see FIG. 8A) indicates the reference plane of the cover unit 13 in the lowest position, a position Q2 (see FIG. 8B) indicates the reference plane in a middle position, and a position Q3 (see FIG. 8C) indicates the reference plane in the highest position. Further, in FIGS. 8A-8C, reference positions in the FFC 67 are marked by position marks C1-C6. When the holder piece 61 is in the lowest position, a section between the position marks C1-C4 is curved to define the second curved section 67.

When the cover unit 13 is uplifted for 10 mm with the reference plane moved to the middle position Q2 (see FIG. 8B), the FFC 67 is relatively pulled downward at the lower-stream section thereof. In this regard, the reference position C1 remains in the same position, but the reference position C6 is uplifted for 10 mm. Accordingly, a peak of the curvature, which is in a position R1 when the reference plane of the cover unit 13 is in the lowest position Q1, is shifted for 5 mm upward to a position R2. Further, a section between the reference positions C2-C5 is curved to define the second curved section 67C.

When the cover unit 13 is further uplifted for additional 10 mm with the reference plane moved to the highest position Q3 (see FIG. 8C), the FFC 67 is relatively pulled further downward at the lower stream section thereof. In this regard, the reference position C1 still remains in the same position, but the reference position C6 is uplifted for additional 10 mm. Accordingly, the peak of the curvature, which is in the position R2 when the reference plane of the cover unit 13 is in the position Q2, is shifted for additional 5 mm upward to a position R3. Further, a section between the reference positions C3-C6 is curved to define the second curved section 67C.

Thus, in accordance with the ascending motion of the holder piece 61 along with the cover unit 13, the range for the second curved section 67C shifts from the section C1-C4 to the section C-C6.

With the movement of the range for the second curved section 67C, the lower-stream section of the FFC 67 is pulled outward from and withdrawn inward in the holder piece 61 within a length L1 (see FIG. 8C). That is, when the holder piece 61 is uplifted, the FFC 67 is pulled out of the holder piece 61 within the length L1. When the holder piece is lowered, the length L1 of the FFC 67, which was pulled out of the holder piece 61, is withdrawn in the holder piece 61. Accordingly, the holder piece 61 is allowed to be uplifted and lowered with respect to the main unit 2.

When the holder piece 61 is vertically moved, the second guide 72 and the third guide 73 in the holder piece 61 prevent the FFC 67 from falling down rearward and hold the FFC 67 to maintain its posture with the curvature. Specifically, when the holder piece 61 is in a lower position, the peak of the second curved section 67C is further away from the first guide 71; therefore, without the second and third guides 72, 73, the FFC 67 may tend to fall down rearward. However, with the second and third guides 72, 73 holding the FFC 67, the FFC 67 can maintain its posture with the curvature so that the FFC 67 stored in the holder piece 61 can be smoothly pulled out of the holder piece 61 when the holder piece 61 is shifted in a higher position and withdrawn in the holder piece 61 when the holder piece 61 returns in a lower position.

The holder piece 61 is formed to have a curved wall 61E at a top end thereof. The curved wall 61E is arced coaxially with respect to the shaft 63. When the cover unit 13 is rotated to be opened, without the curved wall 61E, an area in which the curved wall 61E is formed is exposed between the opened cover unit 13 and the flatbed unit 11. Accordingly, the FFC 67 arranged in the holder piece 61 may be exposed. However, with the curved wall 61E, an outer surface of the curved wall 61E is exposed. Therefore, the FFC 67 is covered and prevented from being exposed.

EFFECTS

In the above MFP 1, the holder piece 61, which provides a path 61F to the FFC 67 to run through, is arranged in the position to have the first opening 61C to be inaccessibly covered by the cover unit 13 even when the holder piece 61 is vertically moved with respect to the flatbed unit 11. Further, the second opening 61D of the holder piece 61 is inaccessibly embedded in the recessed portion 65 in the flatbed unit 11.

Therefore, the FFC 67 arranged in the path 61F inside the holder piece 61 is inaccessibly prevented from being exposed. Accordingly, the FFC 67 is prevented from, for example, being damaged by external force or affected by static electricity.

Further, in the above MFP 1, when the cover unit 13 is vertically moved with respect to the flatbed unit 11, the second curved section 67C in the FFC 67 shifts within the specific range in the path 61F inside the holder piece 61 so that the length of the FFC 67 to be pulled out of the holder piece 61 is adjusted, and the tension to pull the FFC 67 downward is absorbed.

More specifically, due to the first guide 71 fixing the FFC 67 to the holder piece 61, the lower-stream section of the FFC 67 with respect to the fixed section 67A fixed by the first guide 71 can be moved in accordance with the vertical movement of the holder piece 61. With the first curved section 67B, which is formed on the upper-stream section with respect to the fixed section 67B, the tension caused by the rotating movement of the cover unit 13 can be absorbed. Accordingly, the cover unit 13 is allowed to be moved between the open position and the closed position smoothly. Further, with the second curved section 67C, which is formed on the lower-stream section with respect to the fixed section 67B, the tension caused by the vertical movement of the cover unit 13 is absorbed. Accordingly, the cover unit 13 is allowed to be moved between the uplifted position and the lowered position smoothly.

With the above configuration, unlike a holder piece holding a cable and the cable outside the holder being forcibly bended by the holder piece itself, the lower section of the FFC 67 is prevented from being bended by the holder piece 61. Further, because the tension caused by the rotating movement and the vertical movement of the cover unit 13 to pull the FFC 67 is absorbed, the FFC 67 is prevented from being pulled excessively to be damaged by the tension caused by the rotating movement and the vertical movement of the cover unit 13.

With the above configuration, the even when the curved section in the FFC 67 is shifted, the FFC 67 being guided by the first guide 71, the second guide 72, and the third guide 73 is maintained in the predetermined arrangement. Therefore, unlike a cable holder piece without the first guide 71, the second guide 72, or the third guide 73, the holder piece 61 provides the path 61F, in which the FFC 67 is prevented from being bended or falling down out of the arrangement but may be maintained in the arrangement, to the FFC 67.

In the present embodiment, the first guide 71, the second guide 72, and the third guide 73 are integrally formed with the holder piece 61. Therefore, unlike a holder piece formed separately from the first guide 71, the second guide 72, and the third guide 73, a quantity of pieces of components in the MFP 1 can be reduced, and a process to assemble the MFP 1 can be simplified. Further, positional accuracy of the first guide 71, the second guide 72, and the third guide 73 can be improved when the first guide 71, the second guide 72, and the third guide 73 are integrally formed with and fixed to the holder piece 61.

Further, according to the above configuration, in the opening/closing motion of the cover unit 13, the cover unit 13 is rotated with respect to the joint pieces 51, 52 and to the holder piece 61 simultaneously. In other words, the positional relation between the cover unit 13 and the holder piece 61 is changed according to the opening/closing motion of the cover unit 13. Therefore, unlike a cable holder fixed to a cover unit, and positional relation between the cover unit and a holder piece being fixed, the smoother opening/closing motion of the cover unit 13 is achieved.

In particular, the joint pieces 51, 52 and the holder piece 61 in the present embodiment are rotatable coaxially. However, if the joint pieces 51, 52 and the holder piece 61 are not rotatable coaxially, the joint pieces 51, 52 and the holder piece 61 may be required to rotate respectively and in more complicated movement (e.g., the rotation axes moving in a cam groove). With the joint pieces 51, 52 and the holder piece 61 rotating coaxially, on the other hand, the smoother opening/closing motion of the cover unit 13 is achieved without the complicated movement.

With the above configuration, the FFC 67 is covered with the curved wall 61E and prevented from being exposed from a clearance between the cover unit 13 in the open position and the flatbed unit 11. Therefore, the FFC 67 can be securely protected.

Further, with the above configuration, signals are exchanged between the second image sensor 31B arranged in the cover unit 13 and the main unit 2 securely through the FFC 67 being protected by the holder piece 61.

Variation

Although an example of carrying out the invention has been described, those skilled in the art will appreciate that there are numerous variations and permutations of the image processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Figure 9A:
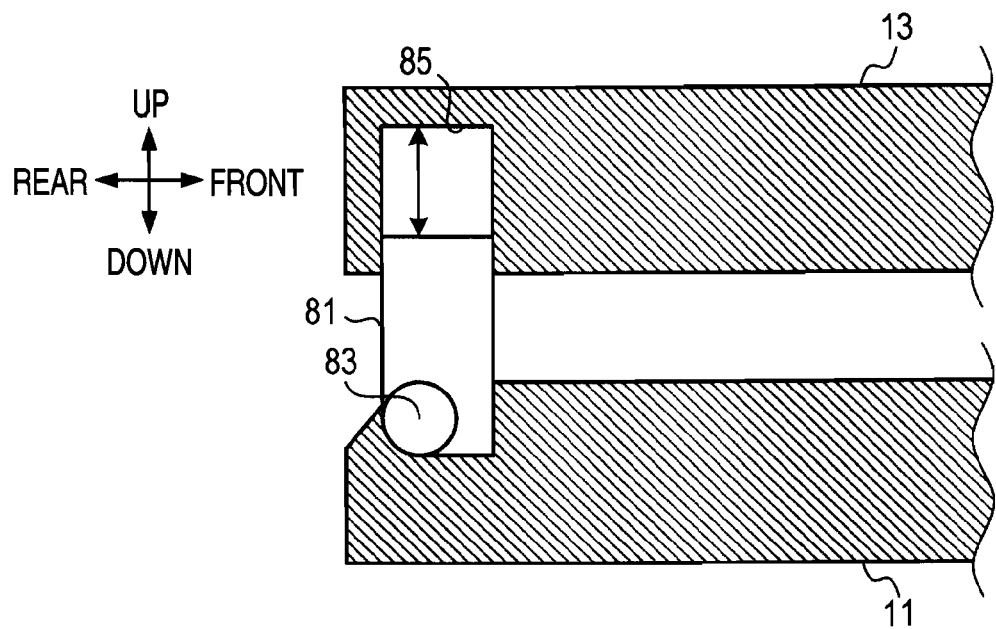
FIGS. 9A-9B illustrate a modified example of a joint piece in the MFP according to the embodiment of the present invention.
Figure 9B:
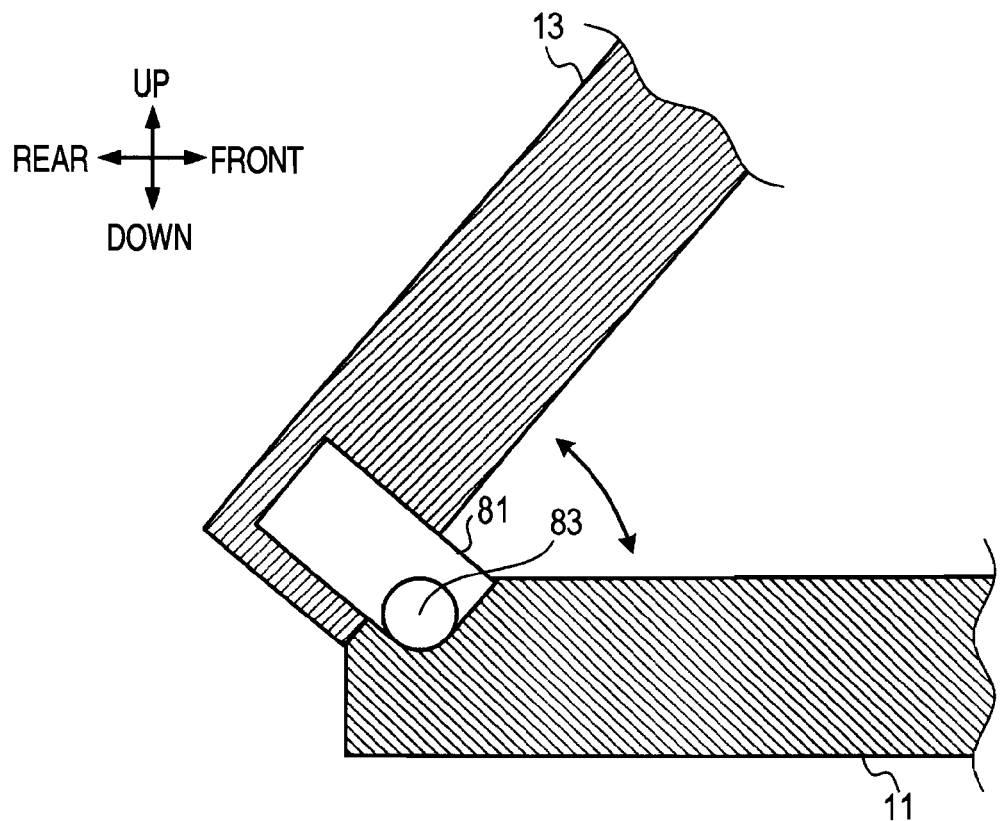

For example, the holder piece may not necessarily be rotatable with respect to the upper cover unit 13 and vertically movable with respect to the lower flatbed unit 11. Instead, for example, a holder piece 81, which is illustrated in FIGS. 9A, 9B, may be employed. The holder piece 81 is rotatable about a shaft 83, which is arranged in the lower flatbed unit 11, at a lower end thereof. Further, an upper end of the holder piece 81 can be inserted in a recessed portion 85 formed in the cover unit 13. The upper end of the holder piece 81 may be inserted halfway or to a top end of the recessed portion so that the cover unit 13 can be vertically movable with respect to the flatbed unit 11. The holder piece 81 may be preferable when the joint pieces are vertically movable with respect to the upper cover unit 13 and rotatable with respect to the lower flatbed unit 11.

For another example, the FFC 67 to be arranged in the holder piece may be replaced with a belt-shaped flexible printed circuits (FPC) and other belt-shaped cable.

For another example, in the above embodiment, the cover unit 13 is openable/closable and vertically movable with respect to the flatbed unit 11 within the scanner unit 3. However, the holder piece 61 may be used to hold a flat cable which connects the scanner unit 3 with the main unit 2 when the scanner unit 3 is openable/closable and vertically movable with respect to the main unit 2.

Further, the holder piece 61 may be used in a single-function image scanner with a cover unit and a flatbed unit instead of the MFP 1.

Furthermore, the holder piece 61 may be used in a printing apparatus, in which, for example, a printer and a cover with an operation panel are electrically connected by a flat cable, when the cover is openable/closable and vertically movable with respect to the printer.

What is claimed is:

1. An image processing apparatus having at least one of an image reading unit to read an image formed on a recording medium and an image forming unit to form an image on a recording medium, comprising:
   a lower unit;
   an upper unit arranged on top of the lower unit;
   a joint member configured to connect the upper unit with the lower unit, whilst the connected upper unit is openable and vertically movable with respect to the lower unit;
   a flat cable configured to electrically connect the upper unit with the lower unit; and a holder member, which is movable with respect to one of the upper unit and the lower unit when the upper unit is moved with respect to the lower unit, the holder member including:
   a first opening, which is covered with the upper unit so as to be unexposed;

a second opening, which is covered with the lower unit so as to be unexposed; and a path connecting the first opening and the second opening to hold the flat cable therein in a curved posture having a peak protruding upward, wherein, when the upper unit is vertically moved with respect to the lower unit, the holder member is vertically moved with respect to the one of the upper unit and the lower unit by shifting a position of the peak of curvature in the flat cable vertically as the flat cable is pulled out of and withdrawn in the holder member.

2. The image processing apparatus according to claim 1, wherein the holder member comprises a guide portion to guide the flat cable in a predetermined arrangement in the path and to maintain the flat cable in the curved posture.

3. The image processing apparatus according to claim 2, wherein the guide portion includes protrusions formed integrally with the holder member in the path.

4. The image processing apparatus according to claim 2, wherein the holder member is coupled with the upper unit to be vertically movable with respect to the lower unit along with the vertical movement of the upper unit;

wherein the guide portion fixes the flat cable to the holder member at least at a part of the flat cable;

wherein the flat cable arranged in the path of the holder member includes:

a fixed section, which is fixed to the holder member by the guide portion;

a first curved section, which is formed on a side of the flat cable closer to the upper unit with respect to the fixed section; and a second curved section, which is formed on a side of the flat cable closer to the lower unit with respect to the fixed section;

wherein a curvature of the first curved section is deformed to allow an opening motion of the upper unit when the upper unit is opened; and wherein an amount of the flat cable to be pulled out of and withdrawn in the holder member is changed by shifting a range of curvature of the second curved section to allow the vertical movement of the holder member.

5. The image processing apparatus according to claim 1, wherein the joint member is rotatably coupled to the upper unit to allow the upper unit to rotate with respect to the joint member when the upper unit is opened and closed with respect to the lower unit; and wherein the holder member is coupled to the upper unit to be rotatable with respect to the upper unit.

6. The image processing apparatus according to claim 5, wherein the joint member and the holder member are coaxially rotatable with respect to the upper unit.

7. The image processing apparatus according to claim 1, wherein the holder member has a top end portion, which is exposed between the upper unit and the lower unit when the upper unit is opened; and wherein the top end portion of the holder member covers the flat cable arranged in the holder member to be maintained unexposed.

8. The image processing apparatus according to claim 1, wherein the image reading unit includes a first image reader, which is arranged in the lower unit, and a second image reader, which is arranged in the upper unit;

wherein the image processing apparatus further includes a controller configured to control the first image reader and the second image reader and to receive data representing images read by the first image reader and the second image reader from the first image reader and the second image reader; and wherein the flat cable is configured to transmit electric signals to be exchanged between the second image reader and the controller.

9. A holder member configured to hold a flat cable, which is configured to electrically connect an upper unit and a lower unit of an electric device, the upper unit being openable and vertically movable with respect to the lower unit, comprising:

a first opening, which is covered with the upper unit so as to be unexposed;

a second opening, which is covered with the lower unit so as to be unexposed; and a path connecting the first opening and the second opening to hold the flat cable therein in a curved posture having a peak protruding upward, wherein the holder member is movable with respect to one of the upper unit and the lower unit when the upper unit is moved with respect to the lower unit; and wherein, when the upper unit is vertically moved with respect to the lower unit, the holder member is vertically moved with respect to the one of the upper unit and the lower unit by shifting a position of the peak of curvature in the flat cable vertically as the flat cable is pulled out of and withdrawn in the holder member.

10. An image processing apparatus having at least one of an image reading unit configured to read an image formed on a recording medium and an image forming unit configured to form an image on a recording medium, comprising:

a lower unit;

an upper unit arranged on top of the lower unit;

a joint member to connect the upper unit with the lower unit, whilst the connected upper unit is openable and vertically movable with respect to the lower unit;

a flat cable to electrically connect the upper unit with the lower unit; and a holder member, which is inserted in a recessed portion formed in the lower unit and is movable with respect to the lower unit along with the upper unit when the upper unit is moved vertically with respect to the lower unit, the holder member including:

a first opening, which is covered with the upper unit so as to be unexposed;

a second opening, which is covered with the lower unit so as to be unexposed; and a path connecting the first opening and the second opening to hold the flat cable therein in a curved posture, wherein, when the upper unit is vertically moved with respect to the lower unit, the holder member is vertically moved with respect to the one of the upper unit and the lower unit by shifting a range of curvature in the flat cable as the flat cable is pulled out of and withdrawn in the holder member.

* * * * *